United States Patent
Murayama

(10) Patent No.: US 8,227,694 B2
(45) Date of Patent: Jul. 24, 2012

(54) WIRE HARNESS EXTERIOR PROTECTING TUBE AND WIRE HARNESS

(75) Inventor: Shigeki Murayama, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 267 days.

(21) Appl. No.: 12/810,065

(22) PCT Filed: Dec. 24, 2008

(86) PCT No.: PCT/JP2008/073387
§ 371 (c)(1),
(2), (4) Date: Jun. 22, 2010

(87) PCT Pub. No.: WO2009/087893
PCT Pub. Date: Jul. 16, 2009

(65) Prior Publication Data
US 2010/0270075 A1    Oct. 28, 2010

(30) Foreign Application Priority Data

Jan. 10, 2008    (JP) ................................. 2008-003724

(51) Int. Cl.
*H01B 7/00*    (2006.01)
(52) U.S. Cl. .................. 174/72 C; 174/72 A; 174/68.1; 174/68.3; 174/101; 174/136; 439/207; 248/68.1
(58) Field of Classification Search ............... 174/72 A, 174/72 C, 68.1, 68.3, 101, 136; 439/207; 248/68.1
See application file for complete search history.

(56) References Cited

U.S. PATENT DOCUMENTS

| | | | | |
|---|---|---|---|---|
| 7,952,030 | B2 * | 5/2011 | Ho et al. ....................... | 174/136 |
| 7,964,796 | B2 * | 6/2011 | Suzuki ......................... | 174/72 C |
| 8,017,866 | B2 * | 9/2011 | Fontana et al. .............. | 174/72 A |
| 8,058,555 | B2 * | 11/2011 | Cardi .......................... | 174/72 A |

FOREIGN PATENT DOCUMENTS

| | | |
|---|---|---|
| JP | A-2000-115944 | 4/2000 |
| JP | A-2001-258129 | 9/2001 |

(Continued)

OTHER PUBLICATIONS

International Search Report issued in International Application No. PCT/JP2008/073387 on Mar. 10, 2009 (with English-language translation).

*Primary Examiner* — Dhirubhai R Patel
(74) *Attorney, Agent, or Firm* — Oliff & Berridge, PLC

(57) ABSTRACT

A wire harness exterior protecting tube minimizes sagging of a wire harness laid in a straddling manner in a vehicle and allows smooth bending of the wire harness. The wire harness exterior protecting tube has longitudinal opposite ends supported in a straddling manner by the vehicle without support between the opposite ends. The protecting tube has at one side section a vertical flat plate section and also has the other section having a square U-shaped or semicircular ring-shaped cross-section. The other section connects to the one side section to form a square or semicircular cross-sectional shape. That portion of the other section which faces the flat plate section is a bellows section having a corrugated shape. The thickness of the flat plate section is adapted to suppress the sagging of the protecting tube caused by the weight of the wire harness and to be bendable by bending of the bellows.

7 Claims, 6 Drawing Sheets

FOREIGN PATENT DOCUMENTS

| | | |
|---|---|---|
| JP | A-2007-159337 | 6/2007 |
| JP | A-2007-181267 | 7/2007 |
| JP | A-2007-181268 | 7/2007 |
| WO | WO 2007/029705 A1 | 3/2007 |

* cited by examiner

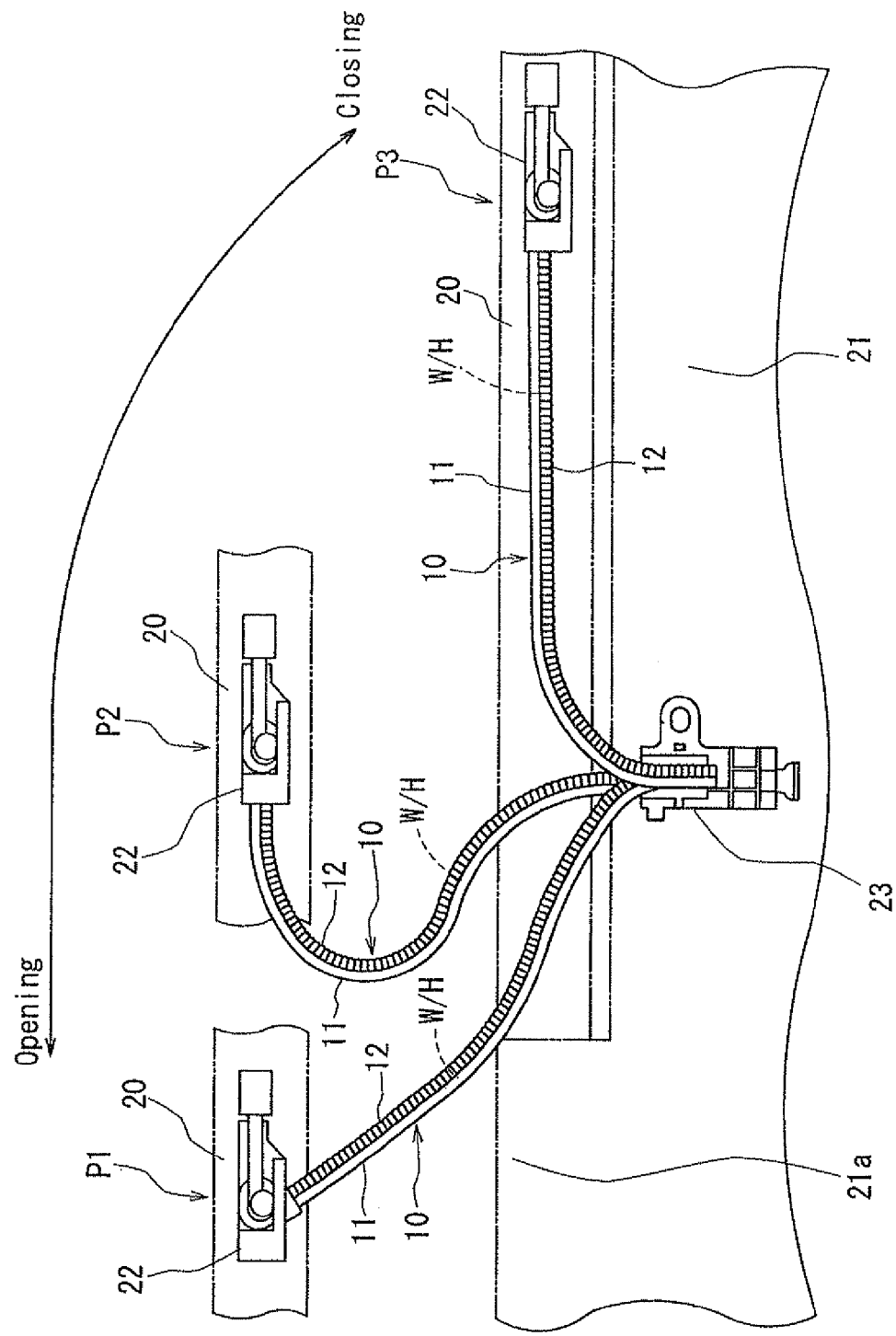

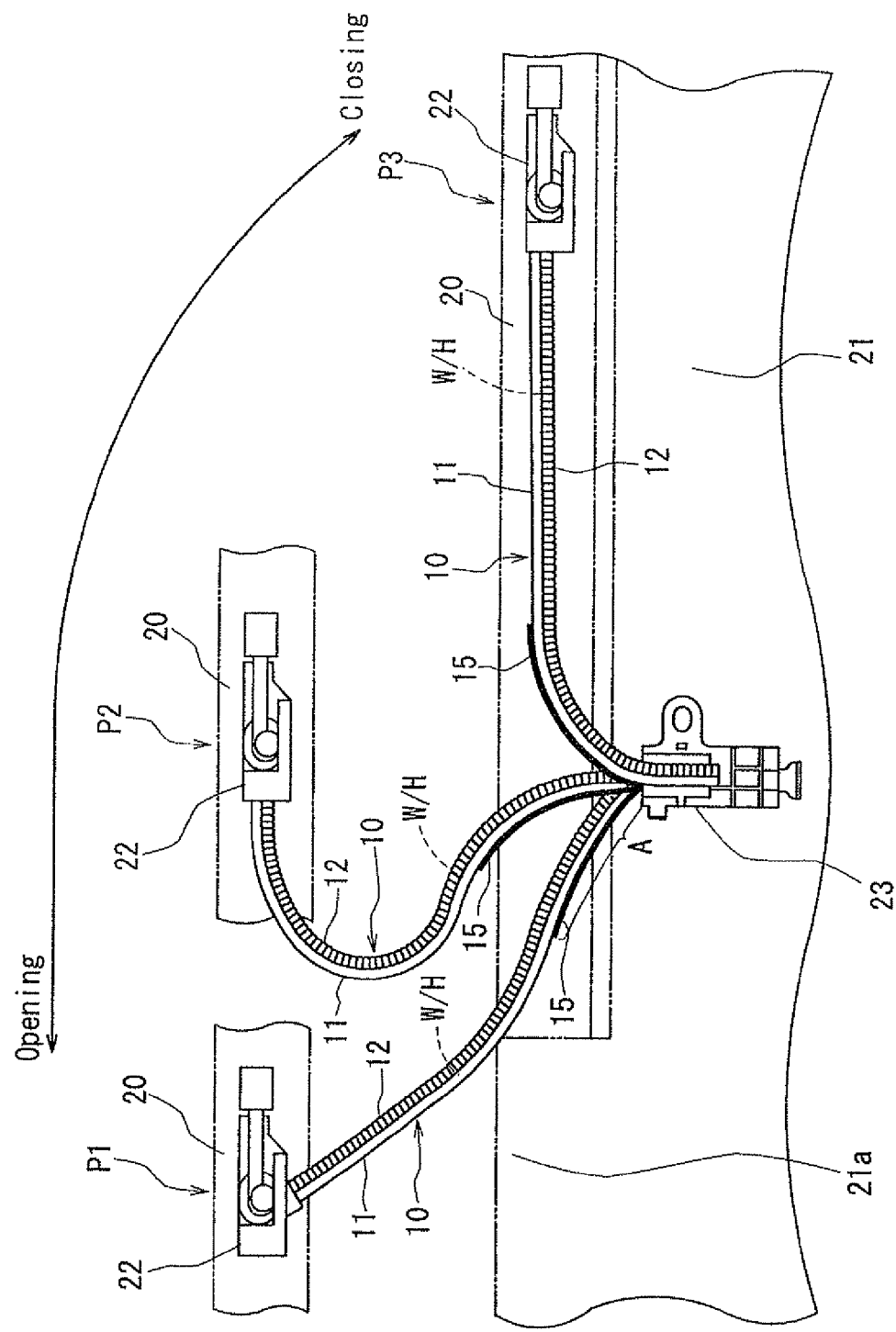

[Prior Art]

WIRE HARNESS EXTERIOR PROTECTING TUBE AND WIRE HARNESS

TECHNICAL FIELD

The present invention relates to a sheathing protection tube for a wire harness and the wire harness. More particularly the present invention is intended to restrain the wire harness to be cross-wired between a slide door of a vehicle and a vehicle body from hanging and allow the wire harness to perform a smooth curving operation.

BACKGROUND ART

The wire harness wired in a vehicle is hitherto protected with various sheathing protection materials to prevent electric wires from interfering with peripheral members and being damaged or broken. For example, as shown in FIG. 7, the annular corrugated tube 1 having the convex portions and the concave portions alternating with each other in its longitudinal direction is disclosed in Japanese Patent Applications Laid-Open No. 2001-258129 (patent document 1). Because the corrugate tube 1 has the construction bendable in all direction, the wire harness is capable of following an operation of a movable member with the wire harness being smoothly curved.

But the wire harness cross-wired in a vehicle with the wire harness being sheathed with the flexible corrugate tube 1 has a problem that the wire harness hangs owing to its weight and interferes with peripheral members. Thus the wire harness is liable to be damaged.

Patent document 1: Japanese Patent Applications Laid-Open No. 2001-258129

DISCLOSURE OF THE INVENTION

Problem to be Solved by the Invention

The present invention has been made in view of the above-described problem. It is an object of the present invention to restrain a wire harness to be cross-wired in a vehicle from hanging and allow the wire harness to perform a smooth curving operation.

Means for Solving the Problem

To solve the above-described problem, the first invention provides a sheathing protection tube for a wire harness in which both sides in a longitudinal direction are supported by a car body and a door and a portion between the both sides is cross-wired without being supported thereby; and the sheathing protection tube being formed by molding an elastic material having flexibility and having a flat part extended in a vertical direction at one side section thereof and other section continuous with the one side section and sectionally rectangular gutter-shaped or sectionally semicircular ring-shaped to form a sectionally rectangle configuration or a sectionally semicircular configuration to insert the wire harness therethrough, wherein a portion of the other section opposed to the flat part is set as a corrugated bellows part having convex portions and concave portions continuous and alternating with each other and longitudinally spaced at certain intervals; and a thickness of the flat part is so set as to prevent the wire harness from hanging owing to a weight thereof; and the bellows part allows the sheathing protection tube to be freely flexible.

As described above, in the sheathing protection tube for the wire harness cross-wired with both sides thereof in the longitudinal direction thereof being supported by the door and the car body, by setting one side section of the sheathing protection tube extended in the vertical direction thereof as the flat part, it is possible to prevent the sheathing protection tube from vertically flexing and effectively restrain the wire harness sheathed with the sheathing protection tube from hanging owing to the weight thereof.

As described above, the sheathing protection tube is formed by molding the elastic material having flexibility. In a portion of the other section, opposed to the flat part, which is sectionally rectangular gutter-shaped or sectionally semicircular ring-shaped and continuous with the one side section consisting of the flat part, there is formed the corrugated bellows part having the convex portions and the concave portions continuous and alternating with each other and longitudinally spaced at certain intervals. According to this construction, although the vertically extended one side section of the sheathing protection tube for the cross-wired wire harness is set as the flat part, the bellows part opposed to the flat part is capable of smoothly curving the sheathing protection tube in its longitudinal direction (horizontal direction). The sheathing protection tube flexibly expanding and contracting is capable of absorbing the difference between the extent of the expansion and contraction of the inner circumference and that of the outer circumference generated when the sheathing protection tube curves. Therefore the wire harness can be curved in a good appearance without excessively flexing.

Therefore when the wire harness sheathed with the sheathing protection tube is wired between a movable member such as the slide door and the car body, it is possible to effectively restrain the wire harness sheathed with the sheathing protection tube from hanging owing to the weight thereof and allow the wire harness to follow an operation of the movable member with the wire harness smoothly curving in the longitudinal direction thereof.

A material to be molded into the sheathing protection tube is not limited to a specific material, but any materials can be used provided that they have flexibility. For example, it is possible to use rubber such as ethylene-propylene rubber (EPDM) and the like and elastomers. When the EPDM is used as the material to be molded into the sheathing protection tube, to prevent the wire harness from hanging and allow the sheathing protection tube to smoothly curve it in its longitudinal direction, it is preferable to set the thickness of the flat part to 2 mm to 3 mm, the thickness of the bellows part to 1 mm to 2 mm, and the hardness (JIS A) of the flat part to 45 to 90 degrees.

In the sectionally rectangular gutter-shaped or sectionally semicircular ring-shaped other section, only the portion thereof opposed to the flat part may be set as the bellows part or the entire other section may be set as the bellows part.

Whether the other section is formed as the sectionally rectangular gutter-shaped configuration or as the sectionally semicircular ring-shaped configuration can be appropriately selected according to a form of the wire harness to be inserted through the sheathing protection tube. For example, in inserting the wire harness flatly holding a plurality of electric wires arranged in parallel through the sheathing protection tube, it is preferable that the other section is sectionally rectangular gutter-shaped. On the other hand, in inserting the wire harness holding bundled electric wires through the sheathing protection tube, it is preferable that the other section is sectionally semicircular ring-shaped.

It is preferable that the total of the thickness of the inner flat portion of the flat part and that of the outer flat portion thereof is set larger than the thickness of the bellows part, that the thickness of the outer flat portion is set larger than the thickness of the inner flat portion, and that the upper end of the outer flat portion is continuous with the other section through a bent portion whose thickness is equal to that of the outer flat portion.

As described above, by setting the thickness of the flat part larger than that of the bellows part, it is possible to securely prevent the wire harness from hanging owing to the weight thereof.

As shown in FIG. 7(B), as a conventional sheathing protection material for the wire harness, a sheathing protection corrugate tube 1 having slits (clearance) 2 formed continuously in the longitudinal direction thereof is known. The construction does not require a work of inserting the wire harness through the sheathing protection tube 1, but allows the wire harness to be inserted into the sheathing protection tube 1 from the side of the sheathing protection tube 1, namely, in the direction orthogonal to the longitudinal direction of the sheathing protection tube 1. Thus in a case where a connecter is connected with a terminal of the wire harness, the sheathing protection tube 1 can be attached to the wire harness after the wire harness and the connector are connected each other and thus has an advantage of enhancing assembling workability.

But the sheathing protection tube 1 is always open owing to the formation of the slit 2. Therefore there is a fear that a foreign matter penetrates into the sheathing protection tube 1 and that the wire harness contacts external interfering members and is damaged thereby. Thus from the standpoint of protection of the wire harness, there is room for improvement in the sheathing protection tube 1.

On the other hand, in the above-described construction of the present invention, the flat part is composed of the inner flat portion and the outer flat portion separately formed and layered one on the other; an upper end of any one of the inner flat portion and the outer flat portion is continuous with an upper side of the other section; and a lower end of the other of the inner flat portion and the outer flat portion is continuous with a lower side of the other section so that the flat part can be opened and closed over the entire length thereof in the longitudinal direction thereof. Therefore in inserting the wire harness into the sheathing protection tube, by opening the inner flat portion and the outer flat portion sideways, the wire harness can be easily inserted thereinto from the side surface of the tube. Thus this construction is capable of enhancing assembling workability. After the wire harness is inserted into the sheathing protection tube, the side surface of the sheathing protection tube can be closed by overlapping the outer flat portion on the inner flat portion. Thus the wire harness can be securely protected without being exposed to the outside.

It is preferable that the thickness of the inner flat portion is set equally to the thickness of the bellows part; that the lower end of the inner flat portion is continuous with the other section through a thin hinge portion; that the thickness of the outer flat portion is set larger than the thickness of the inner flat portion; and that the upper end of the outer flat portion is continuous with the other section through the bent portion whose thickness is equal to that of the outer flat portion.

As described above, by setting the thickness of the inner flat portion equally to that of the bellows part and making the lower end of the inner flat portion continuous with the other section through the thin hinge portion, the side surface of the tube can be closed by easily bending the inner flat portion and overlapping the inner flat portion on the inner side of the outer flat portion after the wire harness is inserted into the tube.

Further as described above, by setting the thickness of the outer flat portion larger than that of the inner flat portion and by making the upper end of the outer flat portion continuous with the other section through the bent portion whose thickness is equal to that of the outer flat portion, it is possible to prevent the outer flat portion of the sheathing protection tube sheathing the wire harness from flexing outward and thus prevent the flat part from being opened.

It is preferable to set the thickness of the outer flat portion to about twice as large as that of the inner flat portion and that of the bellows part.

The second invention provides the wire harness sheathed with the sheathing protection tube having the above-described construction and wired between the slide door and the car body.

As described above, in wiring the wire harness between the slide door and the car body, it is necessary for a cross-wiring portion of the wire harness to follow a movement of the slide door with the cross-wiring portion curving in a narrow space between the slide door and the car body. When the cross-wiring portion of the wire harness hangs in the narrow space, peripheral members interfere with the cross-wiring portion which has hung. As a result, there is a high possibility that the peripheral members damage the wire harness. Thus it is very effective to sheath the wire harness with the sheathing protection tube having the above-described construction.

It is preferable that the flat part is positioned at a vertical portion disposed at the outer side of the car body when the slide door is fully closed, whereas the bellows part is positioned at a vertical portion disposed at the inner side of the car body when the slide door is fully closed.

The sheathing protection tube is applicable to a wire harness cross-wired between the car body and a side door.

In performing opening and closing operations of the slide door by cross-wiring the wire harness between the slide door and the car body, the vertical portion disposed at the inner side of the car body in dependence on a wiring state when the slide door is fully closed is required to have a high elasticity to follow the movement of the slide door. Therefore as described above, by positioning the bellows part of the sheathing protection tube at the vertical portion disposed at the inner side of the car body when the slide door is fully closed and by positioning the flat part of the sheathing protection tube at the vertical portion disposed at the outer side of the car body when the slide door is fully closed, it is possible to effectively prevent the cross-wired wire harness from hanging and allows the wire harness to follow the movement of the slide door with the wire harness being smoothly curved by the bellows part having a high elasticity.

It is preferable that in a region in which the wire harness is curved by opening and closing operations of the slide door and a bending angle is required to be restricted, a bending restriction rib having a large thickness and a required length is set at the bellows part or/and the flat part of the sheathing protection tube.

In cross-wiring the wire harness sheathed with the sheathing protection tube between the slide door and the car body and curving the wire harness according to the opening and closing operations of the slide door, there is a case in which the bending angle of the wire harness should be restricted in a certain region to prevent the wire harness and the peripheral members from interfering with each. Therefore as described above, by setting the bending restriction rib having a large thickness and a required length on the bellows part or/and the flat part of the sheathing protection tube where the bending angle is required to be restricted, it is possible to properly control the bending angle of the wire harness and prevent the wire harness and the peripheral members from interfering with each other with the wire harness smoothly following the movement of the slide door.

For example, when the flat part is positioned at the vertical portion which is disposed at the outer side of the car body in dependence on a wiring state when the slide door is fully closed, by setting a bending restriction rib on the flat part of the sheathing protection tube at a portion thereof disposed in a region in the vicinity of a fixed end of a car body-side supporting member, it is possible to prevent the wire harness from excessively curving when the slide door is fully opened and prevent the cross-wiring portion of the wire harness from interfering with a tire house.

It is preferable to form the bending restriction rib from an elastic material such as a rubber material or a metal plate. It is also preferable to gradually change the thickness of the bending restriction rib so that the wire harness is smoothly curved to a higher extent.

EFFECT OF THE INVENTION

As described above, according to the present invention, in the sheathing protection tube for the wire harness to be cross-wired with both sides thereof in its longitudinal direction being supported by the door and the car body, by setting the one side section of the sheathing protection tube extended in the vertical direction thereof as the flat part, it is possible to prevent the sheathing protection tube from vertically flexing and effectively restrain the wire harness sheathed with the sheathing protection tube from hanging owing to the weight thereof.

As described above, the sheathing protection tube is formed by molding the elastic material having flexibility. In the portion of the other section, opposed to the flat part, which is sectionally rectangular gutter-shaped or sectionally semi-circular ring-shaped and continuous with the one side section consisting of the flat part, there is formed the corrugated bellows part having the convex portions and the concave portions continuous and alternating with each other and longitudinally spaced at certain intervals. Thus although the vertically extended one side section of the sheathing protection tube is set as the flat part, the bellows part opposed to the flat part is capable of smoothly curving the sheathing protection tube in its longitudinal direction (horizontal direction).

As described above, the flat part is composed of the inner flat portion and the outer flat portion separately formed and layered one on the other; the upper end of any one of the inner flat portion and the outer flat portion is continuous with the upper side of the other section; and the lower end of the other of the inner flat portion and the outer flat portion is continuous with the lower side of the other section so that the flat part can be opened and closed over the entire length thereof in the longitudinal direction thereof. Therefore in inserting the wire harness into the sheathing protection tube, by opening the inner flat portion and the outer flat portion sideways, the wire harness can be easily inserted thereinto from the side surface of the tube. Thus this construction is capable of enhancing assembling workability. After the wire harness is inserted into the sheathing protection tube, the side surface of the sheathing protection tube can be closed by overlapping the outer flat portion on the inner flat portion. Thus the wire harness can be securely protected without being exposed to the outside.

As described above, by positioning the bellows part of the sheathing protection tube at the vertical portion disposed at the inner side of the car body when the slide door is fully closed and positioning the flat part of the sheathing protection tube at the vertical portion disposed at the outer side of the car body when the slide door is fully closed, it is possible to effectively prevent the cross-wired wire harness from hanging and allows the wire harness to follow the movement of the slide door with the wire harness being smoothly curved by the bellows part having a high elasticity.

As described above, by setting the bending restriction rib having a large thickness and a required length on the bellows part or/and the flat part of the sheathing protection tube where the bending angle is required to be restricted, it is possible to properly control the bending angle of the wire harness and prevent the wire harness and the peripheral members from interfering with each other with the wire harness smoothly following the movement of the slide door.

BRIEF DESCRIPTION OF THE DRAWINGS

FIG. 3 shows the wiring construction of the wire harness in a first embodiment.

FIG. 4 shows the wiring construction of a wire harness in a second embodiment.

EXPLANATION OF REFERENCE SYMBOLS AND NUMERALS

Figure 1A:
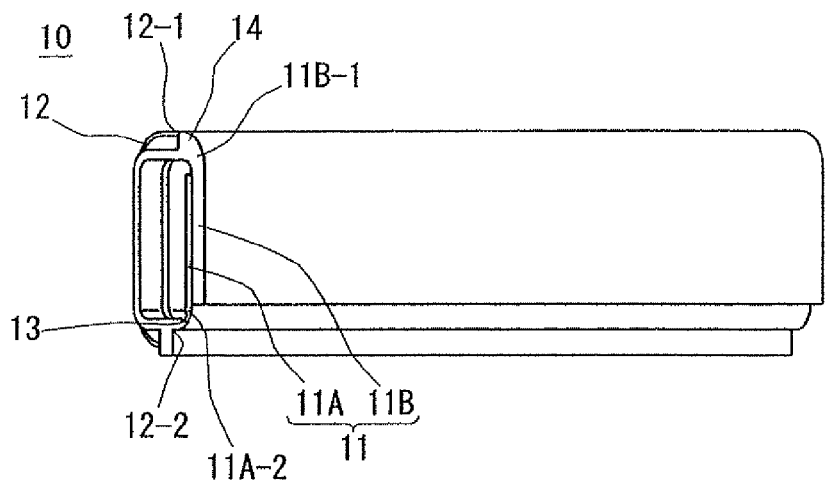
FIG. 1 shows a sheathing protection tube for a wire harness, in which 1(A) is a schematic perspective view as viewed from the side of a flat part, 1(B) is a schematic perspective view of the sheathing protection tube as viewed from the side of a bellows part, and 1(C) is a schematic sectional view of (B).

10: sheathing protection tube
11: flat part
11A: inner flat portion
11B: outer flat portion
12: bellows part
13: thin hinge portion
14: bent portion
15: bending restriction rib
20: slide door
21: car body
22: slide door-side supporting member
23: car body-side supporting member

BEST MODE FOR CARRYING OUT THE INVENTION

Embodiments of the present invention are described below with reference to drawings.

Figure 1B:
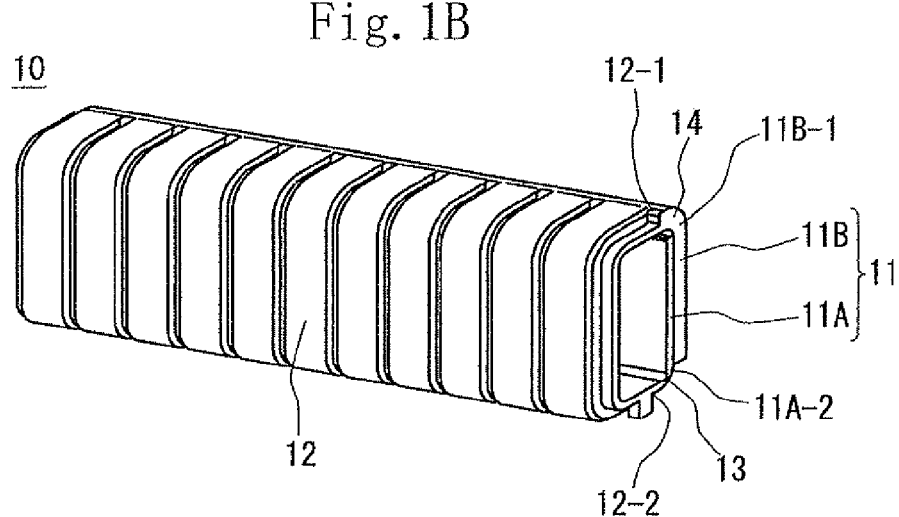
Figure 1C:
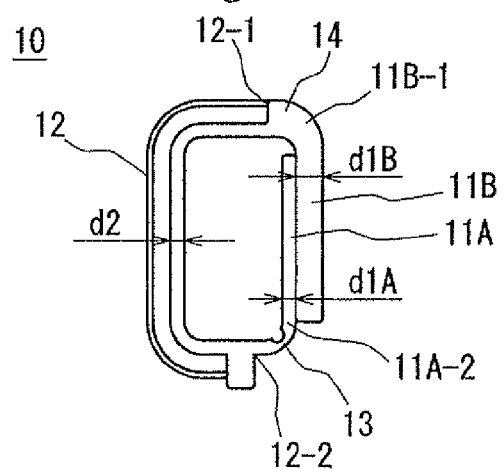

FIGS. 1 through 3 show the first embodiment of the present invention.

As shown in FIG. 3, a sheathing protection tube 10 for a wire harness W/H sheathes a wire harness W/H wired between a slide door 20 of a car and a car body 21. Specifically both sides of the wire harness W/H in the longitudinal direction thereof are supported by a slide door-side supporting member 22 and a car body-side supporting member 23, whereas a portion of the wire harness W/H between both sides thereof cross-wired without being supported thereby is sheathed with the sheathing protection tube 10.

The sheathing protection tube 10 is formed by molding EPDM. As shown in FIG. 1, the sheathing protection tube 10 has a flat part 11 at one side section thereof extended in a vertical direction and other section continuous with the one side section and sectionally rectangular gutter-shaped to form a sectionally rectangle configuration to insert the wire harness therethrough. The entire other section including a portion thereof opposed to the flat part 11 is set as a corrugated bellows part 12 having convex portions and concave portions continuous and alternating with each other and longitudinally spaced at certain intervals.

The flat part 11 is composed of an inner flat portion 11A and an outer flat portion 11B separately formed and layered one on the other. A lower end 11A-2 of the inner flat portion 11A is continuous with a lower side 12-2 of the bellows part 12. An upper end 11B-1 of the outer flat portion 11B is continuous with an upper side 12-1 of the bellows part 12. A thickness d1A of the inner flat portion 11A is equal to a thickness d2 of the bellows part 12. The lower end 11A-2 of the inner flat portion 11A is continuous with the lower side 12-2 of the bellows part 12 through a thin hinge portion 13. A thickness d1B of the outer flat portion 11B is set larger than a thickness d1A of the inner flat portion 11A. The upper end 11B-1 of the outer flat portion 11B is continuous with the upper side 12-1 of the bellows part 12 through a bent portion 14 whose thickness is equal to the outer flat portion 11B.

In the first embodiment, the thickness d1A of the inner flat portion 11A and that of the bellows part 12 are set to 1.4 mm. The thickness d1B of the outer flat portion 11B is set to 2.5 mm. The total hardness (JIS A) of the flat part 11 is set to 60 degrees.

As the wire harness W/H to be sheathed with the sheathing protection tube 10 of the first embodiment, the wire harness W/H flatly holding a plurality of coated electric wires arranged in parallel by means of a laminate consisting of heat-fused films, an adhesive tape or films fused to each other by supersonic wave is used.

Figure 2A:
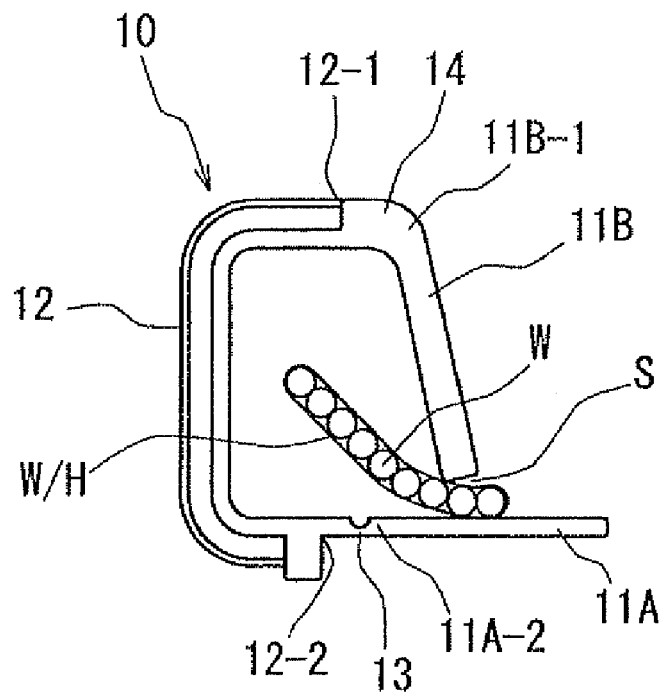
FIG. 2(A) is a sectional view showing a state in which the wire harness is being inserted into the sheathing protection tube.
Figure 2B:
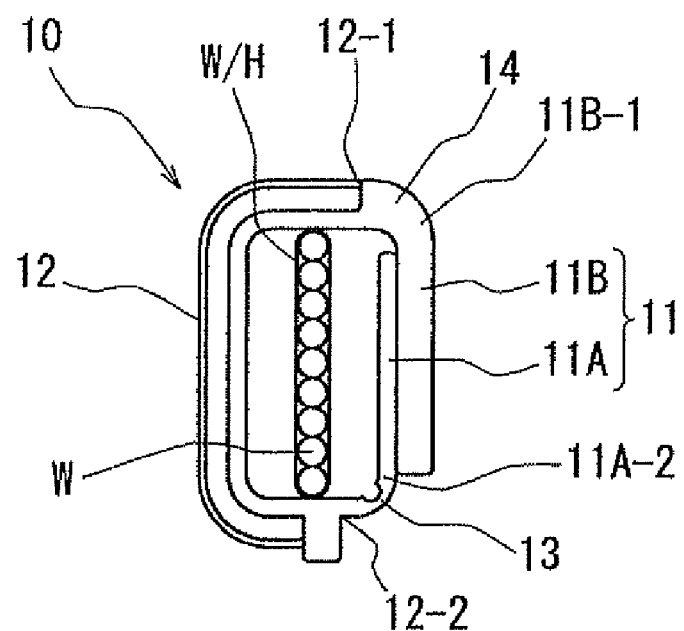
FIG. 2(B) is a sectional view showing a state in which the insertion of the wire harness has finished.

In sheathing the wire harness W/H with the sheathing protection tube 10, initially as shown in FIG. 2(A), the inner flat portion 11A is opened outward to form a longitudinally continuous clearance S between the inner flat portion 11A and the outer flat portion 11B. Thereafter the wire harness W/H is inserted into the sheathing protection tube 10 from a side surface of the sheathing protection tube 10 through the clearance S. After the wire harness W/H is inserted into the space surrounded with the outer flat portion 11B and the bellows part 12, the inner flat portion 11A is bent through the thin hinge portion 13 and overlapped on the inner side of the outer flat portion 11B to close the side surface of the sheathing protection tube 10. In this manner, the sheathing of the wire harness W/H with the sheathing protection tube 10 finishes [see FIG. 2(B)]. As described above, the sheathing protection tube 10 is so constructed that the flat part 11 thereof can be opened and closed over the entire length thereof in the longitudinal direction thereof.

As described above, the wire harness W/H sheathed with the sheathing protection tube 10 is wired between the slide door 20 and the car body 21 (FIG. 3). At this time, the flat part 11 of the sheathing protection tube 10 is positioned at a vertical portion disposed at the outer side of the car body when the slide door 20 is fully closed (P3), whereas the bellows part 12 of the sheathing protection tube 10 is positioned at a vertical portion disposed at the inner side of the car body when the slide door 20 is fully closed.

One end of the sheathing protection tube 10 is fixedly fitted in the slide door-side supporting member 22, whereas the other end thereof is fixedly fitted in the car body-side supporting member 23 to connect a connector connected to a terminal, of the wire harness W/H sheathed with the sheathing protection tube 10, which is disposed at the side of the slide door-side supporting member 22 to a connector disposed at a terminal of a door harness wired inside the slide door 20 and connect a connector connected to a terminal, of the wire harness W/H, which is disposed at the side of the car body-side supporting member 23 to a connector disposed at a terminal of a wire harness wired inside the car body 20. In the first embodiment, the slide door-side supporting member 22 is provided with a rotating body to support the wire harness W/H rotatably.

P1 of FIG. 3 shows a state where the slide door 20 is fully opened. P3 of FIG. 3 shows a state where the slide door 20 is fully closed. P2 of FIG. 3 shows a state where the slide door 20 is in a half-open state which is a stage intermediate between the fully open state and the fully closed state. The wire harness W/H sheathed with the sheathing protection tube 10 follows opening and closing operations of the slide door 20 with the wire harness W/H smoothly curving.

As described above, in the sheathing protection tube 10 for the wire harness W/H to be cross-wired with both longitudinal sides thereof being supported by the slide door 20 and the car body 21, one side section thereof extended in the vertical direction thereof is set as the flat part 11. Thereby it is possible to prevent the sheathing protection tube 10 from vertically flexing and effectively restrain the wire harness W/H sheathed with the sheathing protection tube 10 from hanging by the weight thereof.

As described above, the sheathing protection tube 10 is formed by molding an elastic material such as olefin elastomer. Further the entire sectionally rectangular gutter-shaped other section formed continuously with the one side section consisting of the flat part 11 is set as the corrugated bellows part 12. Thus although the vertically extended one side section of the sheathing protection tube 10 for the cross-wired wire harness W/H is set as the flat part 11, the bellows part 12 opposed to the flat part 11 is capable of smoothly curving the sheathing protection tube 10 in its longitudinal direction.

As described above, the flat part is composed of the inner flat portion 11A and the outer flat portion 11B separately formed and layered one on the other. The lower end 11A-2 of the inner flat portion 11A is continuous with the lower side 12-2 of the bellows part 12. The upper end 11B-1 of the outer flat portion 11B is continuous with the upper side 12-1 of the bellows part 12. The flat part 11 can be opened and closed over the entire length thereof in its longitudinal direction. Therefore in inserting the wire harness W/H into the tube 10, the wire harness W/H can be easily inserted thereinto from the side surface of the tube 10 by opening the inner flat portion 11A outward. Thus this construction is capable of enhancing assembling workability. Further after the wire harness W/H is inserted into the tube 10, the side surface of the tube 10 can be closed by overlapping the outer flat portion 11B on the inner flat portion 11A. Therefore the wire harness W/H can be securely protected without exposing the wire harness W/H to the outside.

Further as described above, the thickness d1A of the inner flat portion 11A is set equally to the thickness d2 of the bellows part 12, and the lower end 11A-2 of the inner flat portion 11A is continuous with the lower side 12-2 of the bellows part 12 through the thin hinge portion 13. Therefore after the wire harness W/H is inserted into the tube 10, the inner flat portion 11A can be overlapped on the inner side of the outer flat portion 11B by easily bending the inner flat portion 11A.

As described above, because the thickness d1B of the outer flat portion 11B is set larger than the thickness d1A of the inner flat portion 11A. Further the upper end 11B-1 of the outer flat portion 11B is continuous with the upper side 12-1 of the bellows part 12 through the bent portion 14 whose thickness is equal to that of the outer flat portion 11B. Therefore it is possible to prevent the outer flat portion 11B of the sheathing protection tube 10 sheathing the wire harness W/H from flexing outward and thus prevent the flat part 11 from opening.

Further as described above, by positioning the bellows part 12 of the sheathing protection tube 10 at the vertical portion disposed at the inner side of the car body when the slide door 20 is fully closed (P3) and positioning the flat part 11 of the sheathing protection tube 10 at the vertical portion disposed at the outer side of the car body when the slide door 20 is fully closed (P3), it is possible to effectively prevent the cross-wired wire harness W/H from hanging and allow the wire harness W/H to follow the movement of the slide door 20 with the wire harness W/H being smoothly curved by the bellows part 12 having a high elasticity.

Figure 5:
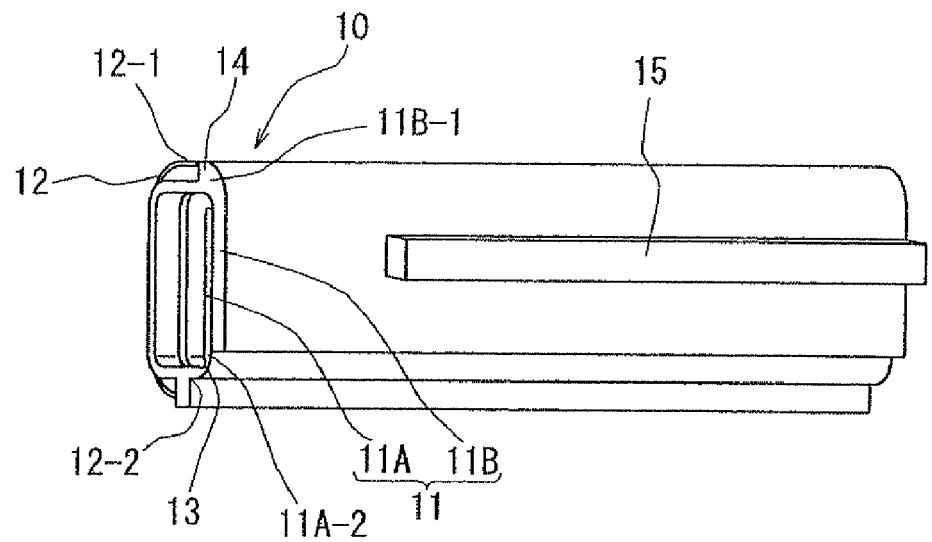
FIG. 5 is a schematic sectional view of the sheathing protection tube in which a bending restriction rib is set at a portion of a flat part.

FIGS. 4 and 5 show the second embodiment.

The second embodiment is similar to the first embodiment except that a bending restriction rib 15 having a thickness of 3 mm is set on the flat part 11 of the sheathing protection tube 10 at a portion thereof disposed in a region A in the vicinity of a fixed end of the car body-side supporting member 23.

Similarly to the first embodiment, in the second embodiment, it is possible to effectively prevent the cross-wired wire harness W/H from hanging and allow the wire harness W/H to follow a movement of the slide door 20 with the wire harness W/H being smoothly curved. Further as described above, in the region A in which the bending angle is required to be restricted, the bending restriction rib 15 having a large thickness is set on the flat part 11 of the sheathing protection tube 10. Thereby by properly restricting the bending angle of the wire harness W/H, it is possible to securely prevent the wire harness W/H and a tire house 21a from interfering with each other.

Figure 6:
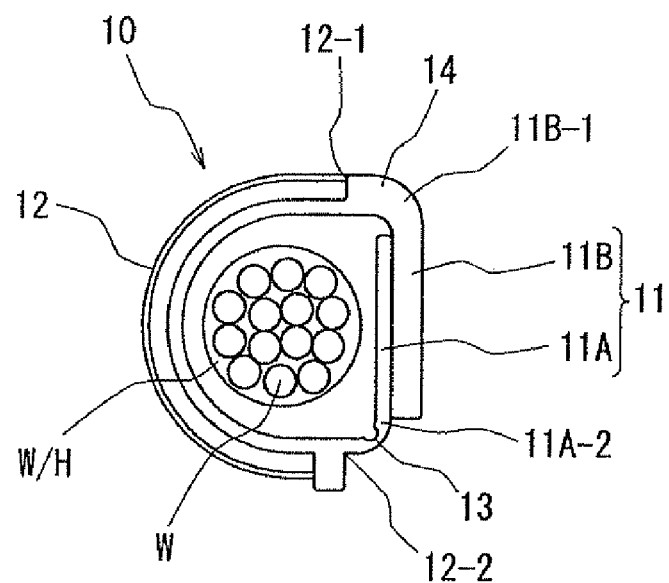
FIG. 6 is a sectional view showing a state in which the wire harness has been inserted into a sheathing protection tube of a third embodiment.
Figure 7A:
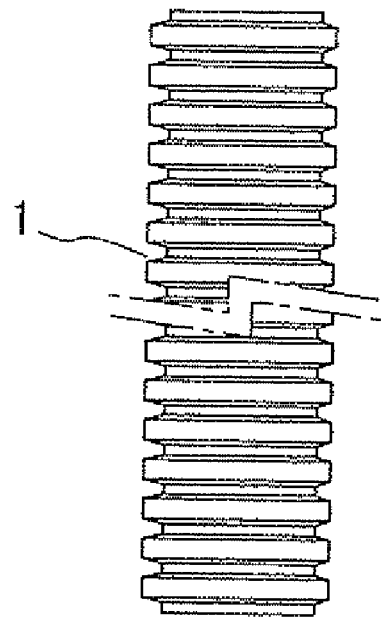
FIG. 7 shows a conventional art.
Figure 7B:

FIG. 6 shows the third embodiment.

The third embodiment is similar to the first embodiment except that the other section continuous with the one side section is sectionally semicircular ring-shaped.

In the third embodiment, the wire harness W/H holding bundled electric wires is sheathed with the sheathing protection tube 10.

Similarly to the first embodiment, in the third embodiment, it is possible to effectively prevent the cross-wired wire harness W/H from hanging and allow the wire harness W/H to follow the movement of the slide door 20 with the wire harness W/H being smoothly curved.

What is claimed is:

1. A sheathing protection tube for a wire harness in which both sides in a longitudinal direction are supported by a car body and a door and a portion between said both sides is cross-wired without being supported thereby; and said sheathing protection tube being formed by molding an elastic material having flexibility and having a flat part extended in a vertical direction at one side section thereof and other section continuous with said one side section and sectionally rectangular gutter-shaped or sectionally semicircular ring-shaped to form a sectionally rectangle configuration or a sectionally semicircular configuration to insert said wire harness therethrough, wherein a portion of said other section opposed to said flat part is set as a corrugated bellows part having convex portions and concave portions continuous and alternating with each of said convex portions and said concave portions, and longitudinally spaced at certain intervals;

a thickness of said flat part is so set as to prevent said wire harness from hanging owing to a weight thereof; and said bellows part allows said sheathing protection tube to be freely flexible;

said flat part can be opened and closed over an entire length thereof in said longitudinal direction thereof; and said wire harness is inserted into said sheathing protection tube from a side surface thereof; and said flat part is composed of an inner flat portion and an outer flat portion separately formed and layered one on the other; an upper end of any one of said inner flat portion and said outer flat portion is continuous with an upper side of said other section; and a lower end of the other of said inner flat portion and said outer flat portion is continuous with a lower side of said other section.

2. The sheathing protection tube for a wire harness according to claim 1, wherein a total of a thickness of said inner flat portion of said flat part and that of said outer flat portion thereof is set larger than a thickness of said bellows part;

a thickness of said inner flat portion is set equally to that of said bellows part, and a lower end of said inner flat portion is continuous with said other section through a thin hinge portion; and a thickness of said outer flat portion is set larger than that of said inner flat portion; and an upper end of said outer flat portion is continuous with said other section through a bent portion whose thickness is equal to that of said outer flat portion.

3. The wire harness sheathed with a sheathing protection tube as defined in claim 2 and wired between said slide door and said car body.

4. The wire harness sheathed with a sheathing protection tube as defined in claim 1 and wired between said slide door and said car body.

5. The wire harness according to claim 4, wherein said flat part is positioned at said vertical portion which is disposed at an outer side of said car body in dependence on a wiring state when said slide door is fully closed, and said bellows part is positioned at an inner side of said car body when said slide door is fully closed.

6. The wire harness according to claim 5, wherein in a region in which said wire harness is curved by opening and closing operations of said slide door and a bending angle is required to be restricted, a bending restriction rib having a large thickness and a required length is set at said bellows part or/and said flat part of said sheathing protection tube.

7. The wire harness according to claim 4, wherein in a region in which said wire harness is curved by opening and closing operations of said slide door and a bending angle is required to be restricted, a bending restriction rib having a large thickness and a required length is set at said bellows part or/and said flat part of said sheathing protection tube.

* * * * *